United States Patent [19]
Kaiser et al.

[11] Patent Number: 6,124,377
[45] Date of Patent: Sep. 26, 2000

[54] MARKING SYSTEM

[75] Inventors: Richard J. Kaiser, Allentown; Arthur N. Urbanski, Bangor, both of Pa.

[73] Assignee: Binney & Smith Inc., Easton, Pa.

[21] Appl. No.: 09/108,526

[22] Filed: Jul. 1, 1998

[51] Int. Cl.[7] .......................... C09D 11/16; C09D 13/00; B41M 1/36
[52] U.S. Cl. .................. 523/161; 106/31.17; 106/31.2; 503/217
[58] Field of Search ................. 523/161; 106/31.07, 106/31.09, 31.13, 31.16, 31.17, 31.18, 31.19, 31.2, 3.21, 31.22; 503/201, 213, 214, 217, 219, 221; 427/151; 428/913, 914

[56] References Cited

U.S. PATENT DOCUMENTS

| | | | |
|---|---|---|---|
| 3,745,672 | 7/1973 | Duskin | 35/26 |
| 3,769,045 | 10/1973 | Maierson et al. | 106/19 |
| 3,772,052 | 11/1973 | Kimura et al. | 428/341 |
| 3,864,146 | 2/1975 | Oda et al. | 117/36.8 |
| 3,957,495 | 5/1976 | Teranishi et al. | 106/19 |
| 4,012,538 | 3/1977 | Miyamoto et al. | 427/145 |
| 4,186,243 | 1/1980 | Astbury et al. | 503/201 |
| 4,244,604 | 1/1981 | Fraser | 282/27.5 |
| 4,245,857 | 1/1981 | Satomura | 282/27.5 |
| 4,263,047 | 4/1981 | Miyamoto et al. | 106/21 |
| 4,289,332 | 9/1981 | Kato | 282/27.5 |
| 4,339,275 | 7/1982 | Tutty | 524/255 |
| 4,372,582 | 2/1983 | Geisler | 282/27.5 |
| 4,374,671 | 2/1983 | Hayashi et al. | 106/21 |
| 4,525,214 | 6/1985 | Panken | 106/19 |
| 4,571,415 | 2/1986 | Jordan, Jr. | 524/428 |
| 4,576,649 | 3/1986 | Oliver et al. | 106/31.75 |
| 4,601,920 | 7/1986 | Mitsuo et al. | 427/150 |
| 4,631,204 | 12/1986 | Mitsuo | 427/150 |
| 4,675,706 | 6/1987 | Miller et al. | 503/210 |
| 4,748,147 | 5/1988 | Sumi-i et al. | 503/204 |
| 4,826,807 | 5/1989 | Shimomura et al. | 503/226 |
| 4,833,119 | 5/1989 | Umeda et al. | 503/210 |
| 4,835,134 | 5/1989 | Umeda et al. | 503/210 |
| 4,840,927 | 6/1989 | Sano et al. | 503/210 |
| 4,877,767 | 10/1989 | Liang et al. | 503/212 |
| 4,880,766 | 11/1989 | Miller et al. | 503/212 |
| 4,960,749 | 10/1990 | Miura et al. | 503/213 |
| 4,978,390 | 12/1990 | Snedeker | 106/19 |
| 5,008,237 | 4/1991 | Liang et al. | 503/212 |
| 5,017,546 | 5/1991 | Brinkman et al. | 503/211 |
| 5,030,281 | 7/1991 | Miller et al. | 106/21 |
| 5,034,370 | 7/1991 | Saeki et al. | 503/210 |
| 5,057,154 | 10/1991 | Kusakata et al. | 106/31.19 |
| 5,084,492 | 1/1992 | Pinell et al. | 523/161 |
| 5,116,410 | 5/1992 | Miller | 106/22 |
| 5,131,776 | 7/1992 | Mott | 401/198 |
| 5,137,797 | 8/1992 | Nakamura | 430/211 |
| 5,178,949 | 1/1993 | Sakamoto et al. | 428/402.2 |
| 5,232,494 | 8/1993 | Miller | 106/22 B |
| 5,276,075 | 1/1994 | Santini | 524/40 |
| 5,288,160 | 2/1994 | Li et al. | 401/198 |
| 5,290,068 | 3/1994 | Gundjian | 283/67 |
| 5,326,388 | 7/1994 | Miller et al. | 106/22 B |
| 5,326,739 | 7/1994 | Tanabe et al. | 503/210 |
| 5,383,954 | 1/1995 | Craig | 106/19 B |
| 5,388,689 | 2/1995 | Kroop et al. | 206/214 |
| 5,389,717 | 2/1995 | Santini et al. | 524/575 |
| 5,393,332 | 2/1995 | Saito et al. | 106/21 R |
| 5,447,901 | 9/1995 | Yamaguchi et al. | 503/210 |
| 5,456,743 | 10/1995 | Fry | 106/27 R |
| 5,460,647 | 10/1995 | Snedeker et al. | 106/22 A |
| 5,462,597 | 10/1995 | Jubran | 503/201 |
| 5,464,470 | 11/1995 | Brachman et al. | 106/22 A |
| 5,485,792 | 1/1996 | Keyser et al. | 106/31.19 |
| 5,486,228 | 1/1996 | Miller et al. | 106/22 B |
| 5,489,331 | 2/1996 | Miller et al. | 106/22 B |
| 5,492,558 | 2/1996 | Miller et al. | 106/22 B |
| 5,498,282 | 3/1996 | Miller et al. | 106/22 B |
| 5,503,665 | 4/1996 | Miller et al. | 106/21 R |
| 5,647,896 | 7/1997 | Nishimura et al. | 106/31.18 |
| 5,814,579 | 9/1998 | Dotson et al. | 503/201 |
| 5,824,715 | 10/1998 | Hayashihara et al. | 522/14 |
| 5,846,901 | 12/1998 | Jubran | 118/31.5 |

FOREIGN PATENT DOCUMENTS

| | | | |
|---|---|---|---|
| 017889 | 4/1980 | European Pat. Off. | |
| 0017889 | 10/1980 | European Pat. Off. | C09D 11/16 |
| 0610739 | 8/1994 | European Pat. Off. | B14M 3/00 |
| 53-137710 | 5/1977 | Japan . | |
| 56-077188 | 11/1979 | Japan . | |
| 56053089 | 5/1981 | Japan . | |
| 2330556 | 4/1999 | United Kingdom | D06P 1/38 |

OTHER PUBLICATIONS

Lewis Sr., Richard J.; Hawley's Condensed Chemical Dictionary 13th Ed., John Wiley and Sons, New York (p. 504), 1997.

*Primary Examiner*—Vasu Jagannathan
*Assistant Examiner*—Callie E. Shosho
*Attorney, Agent, or Firm*—Leydig, Voit & Mayer, Ltd.

[57] ABSTRACT

A marking system that advantageously minimizes messiness during use is disclosed. The marking system comprises a marking composition comprising at least one color precursor in the form of a leuco dye. A marking instrument can be utilized to store the marking composition and/or apply the marking composition to a desired substrate. The substrate is provided with a coating comprising at least one color-triggering developer. Upon application of the leuco dye to the substrate, a chromophore, and hence, color, is formed. If, however, color is inadvertently triggered on an unintended surface, thereby resulting in an unwanted stain, the stain can be readily removed.

58 Claims, No Drawings

MARKING SYSTEM

FIELD OF THE INVENTION

The present invention pertains generally to marking or coloring materials. Particularly, the present invention relates to a marking system that inhibits stray coloring marks from appearing on unintended surfaces, as might be particularly useful for children.

BACKGROUND OF THE INVENTION

It is well known that artwork is viewed as an important developmental tool for children. For example, marking materials, such as paints and markers, are given to children for drawing, painting, and coloring purposes in order to stimulate their creativity and imagination. Of course, a significant drawback with conventional marking materials is that they tend to become very messy in use. Indeed, parents often limit the use of marking materials by children because of the possibility that household objects, such as carpets and furniture, as well as skin and clothing, would be stained by the marking materials.

The inherent messiness of known marking materials is exacerbated by the fact that the undesirable stains are usually extremely difficult to remove. In this regard, the propensity to leave enduring stains on both skin and clothing is one of the most objectionable properties intrinsic to most coloring instruments used by young children. Accordingly, much effort has been expended over many years by producers of these instruments to reduce or eliminate staining. This is attested to by the rather numerous offerings of so-called "washable" markers, which on close examination, are found to remove very poorly from fabrics that are typically used in children's clothing.

For example, European Patent Publication No. 0017889 describes a prior art approach for providing a writing system based on a chemical color reaction. However, the formulations described in European Patent Publication No. 0017889 are unsatisfactory because they are toxic and the dyes undesirably precipitate out of solution quickly. In addition, the onset of premature coloration is an especially significant problem when using the materials disclosed under this approach. Further, the formulations disclosed in European Patent Publication No. 0017889 cause the development of very heavy stains that are extremely difficult to remove and are essentially non-washable.

Accordingly, it will be appreciated that there exists a need for a marking system that inhibits the formation of inadvertent stains on household objects or other unintended surfaces during use. Particularly, there exists a need for a marking system that is not only substantially non-staining to household objects and other unintended surfaces, but which is also non-toxic, simple to make and use, chemically stable, and capable of rapidly generating various colors. It will also be appreciated that there exists a need for a marking system in which any unwanted stains can be readily removed by washing. It is an object of the present invention to provide such a marking system satisfying these needs. These and other objects and advantages of the present invention, as well as additional inventive features, will be apparent from the description of the invention provided herein.

BRIEF SUMMARY OF THE INVENTION

The present invention provides a marking system which comprises a marking instrument which includes at least one leuco dye intermediate color precursor, and a substrate which includes a treated surface. Writing with the marking instrument on the treated surface of the substrate produces color on the substrate corresponding to the selected color of the leuco dye intermediate of the marking instrument. Little or no color mark is developed by contacting the marking instrument with surfaces other than the treated surface, such as skin, clothing, carpeting, walls or other household surfaces. The marking instrument can be in any of a number of different forms, including a marker, a pencil, a crayon, or the like, or even paint. One or more additives, such as, for example, surfactants, antioxidants, buffers, dye blockers, and/or halogen-containing flame retardants can be included in the marking composition.

The treated surface of the substrate has a coating which comprises a color-triggering developer. The developer operates chemically with the color precursor to produce a chromophore resulting in the visible color on the substrate. The coating can also include a binder for retaining the coating components on the substrate.

Advantageously, as a child or other user applies the marking composition to the treated substrate surface, in accordance with the present invention, a bright, bold, vivid color is formed on the substrate. The color is not easily transferred from the substrate. The present invention inhibits the development of color marks if the child writes on his or her skin, clothing, or other unintended surfaces. If, however, undesired stains are developed on household surfaces or other unintended surfaces, such stains can be readily removed via washing, in accordance with the present invention.

DETAILED DESCRIPTION OF THE EMBODIMENTS

In accordance with the present invention, the marking composition comprises at least one color precursor, particularly, a leuco dye intermediate. The leuco dye remains colorless until reacted with a color-triggering developer provided in a coating disposed on a substrate.

The marking composition is applied by way of a marking instrument to the specially coated substrate. The marking instrument includes markers, pencils, crayons, stamps, stamp pads, pens, and the like. In addition, the marking composition can be in the form of paint, and can therefore be applied by way of a paintbrush.

The marking composition also desirably comprises one or more additives, such as, for example, surfactants, antioxidants, buffers (such as, for example, non-water-soluble tertiary amines), dye blockers, and halogen-containing flame retardants. The additives can be provided in any effective amount so long as the desired characteristics of the invention remain.

The color precursor comprises at least one leuco dye intermediate. The leuco dye intermediates are sensitive to oxidation and/or acidic environments. Examples of suitable leuco dyes include, but are not limited to, diarylphthalide dyes, fluoran dyes, indolyphthalide dyes, acylluecoazine dyes, leucoauramine dyes, spiropyrane dyes, rhodaminelactam dyes, triarylmethane dyes and chromene dyes. Preferred leuco dyes include, but are not limited to, Spiro(12H-benzo(a)xanthene-12,1'(3'H)-isobenzofuran-3'-one,9-(diethylamino) (such as COPIKEM® 747), 3-[Butyl-2-methylindol-3-yl]-3-(1-octyl-2-methylindol-3-yl)-1(3H) isobenzofuranone (such as COPIKEM® 35 magenta), 2'-phenylamino-3'-methyl-6'-(dibutylamino) spiro [isobenzofuran-1(3H),9'-(9H)-xanthen]-3-one (such as COPIKEM® 34 Black), substituted Phthalide (such as COPIKEM® 14 Orange), such as COPIKEM® 7 Grape, 2'Di(phenylmethyl)amino-6'(diethylamino)spiro (isobenzofuran-1(3H),9'-(9H)xanthen)-3-one (such as COPIKEM® 5 green). Products identified under the COPIKEM® trademarks are commercially available from the Hilton Davis Company, Cincinnati, Ohio.

The leuco dye intermediates are preferably present in a concentration of about 0.5% to about 6% by weight of the marking composition. For example, the leuco dye intermediates can be present in a concentration of about 0.5% to about 2% by weight of the composition. However, some leuco dye intermediates can be provided, especially in combination, in higher concentrations. By way of example, a black chromophore can be provided by utilizing a combination of three different black leuco dyes, each provided in a concentration of about 2% by weight of the composition.

The leuco dye intermediate is desirably introduced into a liquid medium, which is used as a carrier or vehicle. Preferably, the color precursor is dissolved in solvent. The solvent (or combination of solvents) is desirably substantially optically clear and is selected such that the solubilized dye gives good color formation when reacted with the color-triggering developer (i.e., the solvent should solubilize a sufficient concentration of the leuco dye such that good color formation, based upon visual observation, ultimately results after color-triggering occurs). Further, the leuco dye should not precipitate out of solution at room temperature over time. One of ordinary skill in the art will appreciate that the propensity of the dye to precipitate can be tested by utilizing freeze-thaw cycles. For example, the dyes should not precipitate out of solution when exposed to about 4–5 freeze-thaw cycles. In addition, the solvent desirably has a viscosity of about 12 centipoises or less (and more preferably 10 centipoises or less), in order to be suitable for application in a capillary system, as is particularly desirable for the present invention. The solvents should be non-toxic and non-flammable (e.g., flash points above about 280° F.) and, hence, should exhibit low volatility. In addition, the solvents should be substantially non-odorous. Strictly by way of example, the solvent for carrying the color precursors can be selected from, for example, dimethyl adipate, diethyl succinate, dibutyl phthalate, chlorinated and fluorinated toluenes, such as parachlorobenzotrifluoride (e.g., OXSOL® 100, commercially available from Occidental Chemical Corporation, Dallas, Tex.), or combinations thereof. It is to be noted that OXSOL® 100 is an especially desirable solvent in many respects, except that it tends to exhibit a mothball-like odor, and therefore, can be considered somewhat less desirable. However, odor masks can be utilized to attenuate the odor. The solvent is preferably present in a concentration ranging from about 30% to about 90% by weight of the marking composition, and is more preferably in a concentration ranging from about 55% to about 75% by weight of the composition.

At least one buffer (such as an aforementioned amine) is desirably included in the marking composition in order to inhibit the premature acidification of the dyes. In this regard, some solvents and substrates contain acid functionalities that can trigger the formation of chromophores exhibiting the desired color, but prematurely. For example, cotton fabrics and laundry detergents can contain fatty acids and/or zwitterions that might initiate chromophore development. In response, amines provide a versatile means of buffering the solution of the composition. The most desirable buffers are non-volatile amines that do not evaporate and will not wash out of the fabric prior to removal of the dye, such as perhaps by rinsing the substrate. To this end, it is important that the buffers exhibit little or no water solubility and have a relatively high boiling point (e.g., 100° C. or higher). In this regard, minimizing the water solubility is important because the buffer might otherwise "wash out," for example, when exposed to detergents in a washing machine. Since detergents often contain acid moieties, the color could actually develop on a fabric while in the washer. For example, if the molecular weight of the buffer is too low, the buffer can emulsify and undesirably wash out. In addition, if the boiling point is too low, the buffers can be removed via evaporation in clothes dryers, which commonly operate at temperatures of about 80–85° C.

The amine can be effective in a concentration as low as about 0.0002% by weight of the composition. Preferably, the amine is present in a concentration of about 0.05% to about 1.50% by weight of the composition. The amines can be selected from, for example, tributyl amine, tridodecyl amine, dimethylpiperdone (DMPD), dicyclohexyl amine (DCHA), 4,4'-methylenebiscyclo hexanamine, diazabycyclo (5.4.0) undec-7-ene-1,8, mixed polycyclo aliphatic amine, tetramethyl propylenediamine, 1,3-diaminopropane, 1,7-diaminoheptane, 1,8-diaminooctane, 1,9-diaminodelane, 1,12-diaminododecane, octadecylamine, diethylcyclohexylamine, Jeffamine D-230, Jeffamine XTJ-502, Jeffamine XTJ-504, Jeffamine XTJ-510, Jeffamine T-5000, tributyl amine, trioctylamine or combinations thereof It is to be noted that Jeffamine products are commercially available from Huntsman. While primary, secondary, tertiary, and quaternary amines can be selected, tertiary amines such as, for example, tributyl amine, trihexyl amine, trioctyl amine, tridecyl amine, tridodecyl amine, and combinations thereof work best and generally exhibit the lowest order of toxicity.

The marking composition is preferably provided with at least one antioxidant in order to prevent the premature oxidation of the dyes. Inasmuch as the dyes are bathed in an atmosphere of oxygen, eventually they can oxidize (without intervention) once they are in solution, such as during storage in a marker or other marking instrument. The antioxidants are therefore provided to prevent chromophore development before it is desirable. Examples of suitable antioxidants include, but are not limited to, Vitamin E, Tinuvins (commercially available from Ciba Geigy), 3,5-bis (1,1-dimethylethyl)-4-hydroxy benzenepropanoic acid,2,2-bis[[3-[3.5-bis(1,1-dimethylethyl)-4-hydroxyphenyl]-1-oxopropoxy]methyl]1,3-propanediyl ester (commercially available from Ciba as Irganox 1010), Irganox 1076 (commercially available from Ciba), butylated hydroxytoluene (BHT), butylated hydroxyanisole (BHA), e.g., tert-butylhydroquinone (TBHQ), and combinations thereof. Desirably, the antioxidants are substantially non-soluble to water (so as to avoid washing out) and are not volatile when exposed to heat. With respect to volatilization, the antioxidants should desirably resist volatilization and evaporation at temperatures typically found in operating clothes dryers (such as temperatures of about of 80–85° C.). The amount of antioxidant provided in the marking composition can vary depending on the chemistry of the particular antioxidant. For example, Vitamin E is suitable at levels of about 5% by weight of the marking composition or higher. Other antioxidants, such as the Tinuvins, work well at lower concentrations, such as perhaps, about 2% by weight of the marking composition. Additionally, ultraviolet absorbing materials may also be added to inhibit the fading of the developed colors. Tinuvins are helpful in this regard as well.

Surfactants in any effective amount are also useful in preferred marking compositions of the invention. Examples of suitable surfactants include, for example, acetylinic diol-based compounds, such as, for example, tetramethyl decynediol in a 2-ethyl hexanol solvent (such as Surfynol 104A, commercially available from Air Products, Inc.), ethoxylated acetylenic diols (such as Dynol 604, commercially available from Air Products, Inc.), Witconate P-1059, Witcoamide 511, Witcoamide 5138, Surfynol CT-171, Surfynol CT-111, Surfynol CT-131, Surfynol TG, DBE Microemulsion, Fluorad FC-431, Fluorad FC-430, Surfynol 104A, Dynol 604 and combinations thereof It is to be noted that Witco products are commercially available from Witco Corporation and that Fluorad products are commercially available from 3M. Preferably, the surfactants are provided in a concentration of about 1% to about 30% by weight of the marking composition. The surfactants are provided in order to modify properties such as viscosity and surface tension of the compositions in order to improve dye solubility and act as an anti-redeposition agent of the dye on fabrics when washed. Preferably, the surfactant, or surfactants as combined, have an hydrophilic-lipophilic balance score of about 6 or less, and more preferably from about 3 to about 6. In this regard, it is to be noted that the hydrophilic-lipophilic balance (HLB) is a rating on a scale ranging from 0 to 14. The score identifies the relative hydrophobicity and hydrophilicity of the surfactants. Surfactants having HLB scores of about 3 to about 6 are most desired because those surfactants are more hydrophobic than hydrophilic, and hence, more soluble in solvents than in water, but still are partially soluble in water. Advantageously, the desired HLB rating can be achieved even when mixing surfactants. For example, Surtynol TG has an HLB that is too high for use alone. However, Surfynol TG can be combined with a surfactant having a much lower HLB so that the combined surfactants can have the most desired HLB falling within the range of about 3 to 6. As such, preferable surfactants permit enhanced dye solubility, yet still permit washing from fabric so as to avoid staining of the fabric.

With respect to water, a dibasic ester or other microemulsion concentrate (such as the dibasic ester microemulsion concentrate available from DuPont) can be utilized to enhance the inclusion of water. In this regard, water is typically not desired in the system because of the potential for premature color development. It is believed that the water can act like a Lewis acid and trigger inadvertent color development. However, some solvents used for solubilizing the dye in the marking composition can "attack" (i.e., dissolve the developer or developed color in the substrate coating) without intervention. As a result, developed color can be transferred undesirably to skin, clothing, or household surfaces. When employing such developer-attacking solvents, the inclusion of water, for example, by way of a microemulsion concentrate, beneficially provides a "barrier" to this undesirable transfer of developed color. Particularly, the water precludes the solvent from reacting with the coating composition until the water flashes off (e.g., after just a second or few seconds). This delay sufficiently prevents the color transfer or "pick-up". Further, in order to prevent premature coloration due to the presence of water, the water can be desirably pre-neutralized with a buffer, such as a water-soluble amine.

Flame retardants of conventional types (such as, for example, halogen containing flame retardants) can be optionally employed in marking compositions of the invention. Examples of suitable flame retardants include tris-nonylphonyl phosphite (e.g., DOVERPHOS 4®, commercially available from Dover Chemical Corporation, Dover, Ohio), a liquid brominated, chlorinated olefin (e.g., DOVERGUARD 8426, commercially available from Dover Chemical Corporation, Dover, Ohio), and combinations thereof. The flame retardants are particularly desirable because they prevent ignition, particularly of associated materials, such as plastic found in the marker or other marking instrument. Flame retardants are more useful in marking compositions that employ solvents having flash points below about 280° F. (about 137° C.). Furthermore, it has been found that halogen containing flame retardants can often provide the added benefit of serving as dye solubilizers. Accordingly, the concentration of the flame retardant is preferably in a range of about 25% to about 100% by weight of the solvent in the marking composition.

In addition, the marking composition can also desirably include at least one dye blocker, such as, for example, a novolac epoxy, tannic acid, and any combination thereof The dye blocker is desirably soluble in organic solvents such as an aforementioned suitable solvent selected for inclusion in the marking composition. Advantageously, the dye blockers prevent or inhibit color development on fabrics, especially when the fabric is exposed to high temperatures, as can be typically encountered in washing machines operated at high temperatures and clothes dryers operated at high temperatures. Preferably, the dye blocker is provided in a concentration of about 0.5% by weight of the marking composition to about 15% by weight of the marking composition. Most preferably, the dye blocker is provided in a concentration of about 0.5% to about 3% by weight of the marking composition.

Critically, the substrate coating comprises a color-triggering developer, which serves as a chemical activator or initiator for the conversion of the color precursor into chromophore containing dyes that display bold and vivid colors. When the color precursor is a leuco dye intermediate, the color-triggering developer is a Lewis acid. The most desirable Lewis acids for use as the color-triggering developer of the present invention are zinc containing resins. Activated clays and phenolic resins are less desirable because of their relatively slow rate of reactivity. In addition, clays and phenolic resins form color-forming complexes that are undesirably water soluble. This water solubility is problematic because water can then remove the color marks from the coating. The color complexes of the marks formed by the use of zinc-containing developers are less water sensitive and, accordingly, the color is less apt to be removed from the paper and is not rendered potentially messy. Most preferably, an especially desirable color-triggering developer is a zincated carboxylic resin that is dispersed in the coating. For example, the zinc acts as a Lewis acid and causes the rearrangement of the dye molecule, thereby resulting in the development of the desired chromophore. Particularly, the development of the color occurs when the color-triggering developer reacts with the leuco dye intermediate to form a highly conjugated compound thereby resulting in a chromophore of intense color. The color-triggering developer is present in a concentration of at least about 12% by weight of the coating in order to achieve a desired intensity for the colors. Levels of color-triggering developer below about 12% can be utilized, but can result in the development of weaker colors.

The developer is preferably dispersed in water. The coating is desirably also provided with a void cell former, such as, for example, calcium carbonate. The calcium carbonate is precisely geometrically formed such that it forms a void cell in the coating. The void cell functions by capillary action. Particularly, the calcium carbonate is designed to hold the developed ink in a cell to prevent ink penetration into and across the substrate in order to prevent smearing of the developed ink. If the marking composition solvent is non-volatile and not otherwise held in a micelle, the solvent will flow across the paper and carry the chromophore with it. As a result, the color image becomes fuzzy and indistinct. In the event that a volatile solvent is utilized in the marking composition, the void cell forming species, such as, for example, calcium carbonate, may not be required because the solvent can tend to evaporate off of the substrate, thereby leaving the dye chromophore locked onto the substrate. By way of example, and not limitation, the void cell former can be present in a concentration of about 20% to about 55% by weight of the coating composition, and more preferably, about 35% to about 40% by weight of the coating composition.

The calcium carbonate and other solid ingredients are held onto the substrate by at least one binder, such as, for example, starch-modified latex. The latex can be cross-linked, such as perhaps, with a zinc or zirconium salt to enhance the strength of the film. For example, after the coating dries, cross-linking occurs, especially by application of heat. Desirably, the coating can be deposited on the substrate in a concentration of at least about ten grams of dry coating per each square meter of substrate. Lower ratios of coating deposition are less desirable because they generally result in the formation of less intense colors. Particularly desirable substrates include papers that have barrier properties such as those used in cereal packaging and other printing applications requiring solvent resistance. However, the substrate can be formed of any of a variety of materials. As such, other substrates, especially those formed from paper and/or plastic, are contemplated and are encompassed by the present invention.

In order to enhance reactivity between the coating and the leuco dye, especially when the marking composition is incorporated into a wax crayon, liquid plasticizers (e.g., non-volatile solvents) can be incorporated into the coating. When the water is evaporated from the coating and the marking composition is subsequently applied to the coating composition, the liquid plasticizer can facilitate the ability of the leuco dye to penetrate the coating more rapidly, thereby resulting in a faster color-formation reaction. Accordingly, the plasticizer increases the reactivity (e.g., by a factor of 10). Examples of plasticizers include, but are not limited to, dibutyl phthalate and citrate ester (e.g., Citroflex A4). In addition, an oil absorption enhancer, such as, for example, diatomaceous earth, can be included in the coating composition.

Alternatively, the coating may incorporate an encapsulated solvent that desirably ruptures when written upon. The solvent is desirable because it increases the speed of color development and permits the reaction to proceed at a visible rate. For example, employment of an encapsulated solvent is particularly desirable where the marking instrument is in the form of a wax crayon. In this regard, it will be appreciated that wax is a poor electron transfer medium. Consequently, the solvent allows the reaction to proceed at a visible rate. The plasticizers are particularly desirable for inclusion in the encapsulated solvent. Advantageously, the marking system of the present invention is substantially non-staining to all surfaces other than the substrate having the coating comprising the color-triggering developer molecule.

Significantly, the color marks formed from the leuco dye color precursor and the Lewis acid color-triggering developer are washable in the event that color marks form on unintended surfaces. In this regard, while the present invention inhibits the formation of color marks on unintended surfaces, color marks could be formed inadvertently in some environments. For example, laundry detergents contain zwitterions designed to be acidic and basic at the same time to facilitate soil removal. The acids in the laundry detergent can cause color development on fabrics marked with the leuco dyes during washing with most conventional laundry detergents commonly used when washing clothes in a washing machine. In addition, many fabrics, such as cotton, contain natural fatty acids which can trigger color development with leuco dyes, especially when exposed to heat, as is typically found in a clothes dryer. In this regard, heating can accelerate the formation of color. The present invention inhibits the formation of color, but if color does form, those unintended marks are washable. The package of additives described herein provide washability. Particularly, color marks formed display a $\Delta E$ (as described herein below) of 5 or less, and more preferably, 3 or less.

The following examples further illustrate the present invention, but, of course, should not be construed as in any way limiting its scope. Quantities are in percent by weight of the total composition.

Examples of marking compositions comprising leuco dye intermediates of the present invention are provided in Examples 1–8. The components are added in the order in which they are listed. The components are mixed while heating to approximately 90° C. until the composition is clear. Each marking composition resulted in the formation of a bright, vivid color upon exposure to the color-triggering developer.

Examples 1–8 also illustrate the washability of the formulations of the present invention. In this regard, fabric fugitivity data, stated in terms of $\Delta E$ values, can be measured by way of a spectrophotometer. The measured $\Delta E$ values correspond to visual observations as follows:

| | |
|---|---|
| $\Delta E$ = up to 2.2 | no visible stain |
| $\Delta E$ = 2.20–2.90 | trace |
| $\Delta E$ = 2.90–4.90 | slight |
| $\Delta E$ = 4.90–6.40 | moderate |
| $\Delta E$ = over 6.40 | heavy |

In Examples 1–8, the washability (in terms of $\Delta E$) was tested after marking the composition onto a fabric. The fabric was then subjected to washing in a washing machine set on a warm wash and then drying the fabric in a clothes dryer on a hot setting. The washability was then tested and evaluated.

EXAMPLE 1—BROWN

| Component | Weight % |
|---|---|
| dimethyl adipate(solvent) | 62.50 |
| Irganox 1010 (antioxidant) | 10.00 |
| Tridecyl amine (buffer) | 0.25 |
| Trihexyl amine (buffer) | 0.25 |
| Surfynol 104A (surfactant) | 10.00 |
| Dynol 604 (surfactant) | 15.00 |
| Hodogaya Green DCF (color precursor) | 0.50 |
| Hodogaya Orange DCF (color precursor) | 1.50 |
| Total | 100.00 |

-continued

| Component | Weight % |
|---|---|
| ΔE Wash Value | 2.41 |

EXAMPLE 2—RED

| Component | Weight % |
|---|---|
| dimethyl adipate (solvent) | 62.90 |
| Irganox 1010 (antioxidant) | 10.00 |
| Tridecyl amine (buffer) | 0.25 |
| Trihexyl amine (buffer) | 0.25 |
| Surfynol 104A (surfactant) | 10.00 |
| Dynol 604 (surfactant) | 15.00 |
| Hodogaya Orange DCF (color precursor) | 1.52 |
| COPIKEM ® 7 Grape (color precursor) | 0.08 |
| Total | 100.00 |
| ΔE Wash Value | 3.41 |

EXAMPLE 3—BLUE

| Component | Weight % |
|---|---|
| dimethyl adipate (solvent) | 62.74 |
| Irganox 1010 (antioxidant) | 10.00 |
| Tridecyl amine (buffer) | 0.25 |
| Trihexyl amine (buffer) | 0.25 |
| Surfynol 104A (surfactant) | 10.00 |
| Dynol 604 (surfactant) | 15.00 |
| Hodogaya Blue NC-1 (color precursor) | 1.76 |
| Total | 100.00 |
| ΔE Wash Value | 0.82 |

EXAMPLE 4—ORANGE

| Component | Weight % |
|---|---|
| dimethyl adipate (solvent) | 63.00 |
| Irganox 1010 (antioxidant) | 10.00 |
| Tridecyl amine (buffer) | 0.25 |
| Trihexyl amine (buffer) | 0.25 |
| Surfynol 104A (surfactant) | 10.00 |
| Dynol 604 (surfactant) | 15.00 |
| Hodogaya Orange DCF (color precursor) | 1.50 |
| Total | 100.00 |
| ΔE Wash Value | 2.51 |

EXAMPLE 5—GREEN

| Component | Weight % |
|---|---|
| dimethyl adipate (solvent) | 58.40 |
| Irganox 1010 (antioxidant) | 15.00 |
| Trihexyl amine (buffer) | 0.30 |
| Tridecyl amine (buffer) | 0.30 |
| Surfynol 104A (surfactant) | 10.00 |
| Dynol 604 (surfactant) | 15.00 |

-continued

| Component | Weight % |
|---|---|
| Hodogaya Green DCF (color precursor) | 1.00 |
| Total | 100.00 |
| ΔE Wash Value | 3.09 |

EXAMPLE 6—BLACK

| Component | Weight % |
|---|---|
| dimethyl adipate (solvent) | 57.90 |
| Irganox 1010 (antioxidant) | 15.00 |
| trihexyl amine (buffer) | 0.3 |
| tridecyl amine (buffer) | 0.3 |
| Surfynol 104A (surfactant) | 10.00 |
| Dynol 604 (surfactant) | 15.00 |
| Copikem #34 Black (color precursor) | 0.5 |
| Copikem #4 Black (color precursor) | 0.5 |
| Hodogaya NC-Black-1 (color precursor) | 0.5 |
| Total | 100.00 |
| ΔE Wash Value | 2.47 |

EXAMPLE 7—PURPLE

| Component | Weight % |
|---|---|
| dimethyl adipate (solvent) | 58.90 |
| Irganox 1010 (antioxidant) | 15.00 |
| trihexyl amine (buffer) | 0.3 |
| tridecyl amine (buffer) | 0.3 |
| Surfynol 104A (surfactant) | 10.00 |
| Dynol 604 (surfactant) | 15.00 |
| Copikem #7 Grape (color precursor) | 0.5 |
| Total | 100.00 |
| ΔE Wash Value | 2.1 |

EXAMPLE 8—YELLOW

| Component | Weight % |
|---|---|
| dimethyl adipate (solvent) | 57.56 |
| Irganox 1010 (antioxidant) | 15.00 |
| trihexyl amine (buffer) | 0.1 |
| tridecyl amine (buffer) | 0.1 |
| Surfynol 104A (surfactant) | 10.00 |
| Dynol 604 (surfactant) | 15.00 |
| Copikem #37 Yellow (color precursor) | 0.24 |
| Ciba Pergascript Yellow I-3R (color precursor) | 2.00 |
| Total | 100.00 |
| ΔE Wash Value | 2.47 |

Example 9 provides an exemplary formulation for the marking composition of the present invention that includes the use of a dye blocker, and particularly a novolac epoxy dye blocker (commercially available as Epon 825 from Shell Chemical). The washability of the formulation was tested on a single layer fabric after use in a washing machine set on a hot wash followed by exposure to heat in a clothes dryer on a hot setting.

EXAMPLE 9

| Component | Amount (grams) |
|---|---|
| dimethyl adipate (solvent) | 91.61 |
| Epon 825 (dye blocker) | 0.20 |
| Irganox 1010 (antioxidant) | 3.00 |
| trihexyl amine (buffer) | 0.03 |
| tridecyl amine (buffer) | 0.03 |
| Surfynol 104A (surfactant) | 2.00 |
| Dynol 604 (surfactant) | 3.00 |
| Copikem 7 Grape (color precursor) | 0.13 |
| ΔE Wash Value | 2.80 |

Example 10 illustrates an exemplary composition that can be utilized for the substrate coating.

EXAMPLE 10—COATING COMPOSITION

| Material | Description | Amount (grams) | Percent |
|---|---|---|---|
| Water | city water | 39 | 6.03 |
| Albagloss S Slurry | calcium carbonate dispersion | 150 | 23.20 |
| AMP 95 | Isopropanol Amine | 3 | 0.46 |
| Soribitol | Plasticizer | 12 | 1.66 |
| Celite 281 | diatomaceous Earth | 50 | 7.73 |
| Albagloss S Slurry | calcium carbonate slurry | 183 | 26.31 |
| HRJ 10802 | zincated resin | 166 | 25.68 |
| Pennsize 630 | starch modified SBR latex | 40 | 6.19 |
| Bacote 120 | organic zirconium crosslinker | 0.5 | 0.46 |
| FC 120 | fluorocarbon surfactant | 646.5 | 100.00 |
| Total Weight | | 646.5 | 100.00 |

In making the coating compositions set forth in Example 10, the city water, Albagloss S slurry (calcium carbonate dispersion), AMP 95, and sorbitol are mixed in a mixer operating at a low speed. Celite 281 is then added while increasing the mixer speed. The mixer speed is held for 10 minutes at a dispersing speed. The mixture is then pumped into a larger mixing tank. The Albagloss S slurry (calcium carbonate slurry), HRJ 10802, Pennsize 630, Bacote 120 and FC 120, are then added and mixed thoroughly for 15 minutes.

Examples 11–12 are provided as comparative examples. The formulations utilized in Examples 11–12 are exemplary formulations described in European Patent No. 0017889, as shown in Tables I and II.

TABLE I

| | Formulations (quantities in grams) | | | |
|---|---|---|---|---|
| | Purple | Yellow | Blue | Orange |
| Dipentene (solvent) | 9.00 | 9.00 | 9.00 | 9.00 |
| COPIKEM ® 7 Grape (color precursor) | 0.50 | — | — | — |
| Ciba Pergascript Yellow I-3R (color precursor) | — | 0.50 | — | — |
| Hodogaya Orange DCF (color precursor) | — | — | — | 0.50 |
| Ethanol (solvent) | 0.50 | 0.50 | 0.50 | 0.50 |
| Hexamethylenetetramine (buffer) | 0.05 | 0.05 | 0.05 | 0.05 |

TABLE II

| | Formulations (quantities in grams) | | | |
|---|---|---|---|---|
| | Green | Black | Red | Brown |
| Dipentene (solvent) | 9.00 | 9.00 | 9.00 | 9.00 |
| Ciba Pergascript Yellow I-3R (color precursor) | 0.42 | — | — | — |
| Hodogaya Blue NC-1 (color precursor) | 0.08 | — | — | — |
| COPIKEM ® 4 Black (color precursor) | — | 0.17 | — | — |
| COPIKEM ® 34 Black (color precursor) | — | 0.17 | — | — |
| Hodogaya Black NC-1 (color precursor) | — | 0.17 | — | — |
| Hodogaya Orange DCF (color precursor) | — | — | 047 | — |
| COPIKEM ® 7 Grape (color precursor) | — | — | 0.03 | 0.38 |
| Hodogaya Green DCF (color precursor) | — | — | — | 0.13 |
| Ethanol (solvent) | 0.50 | 0.50 | 0.50 | 0.50 |
| Hexamethylenetetramine (buffer) | 0.05 | 0.05 | 0.05 | 0.05 |

All of the formulations utilized in the comparative examples proved to be unstable. Before testing, each formulation was filtered through an 0.8 μ filter. This filtered material still was unstable. Prior to using each formulation, samples had to be mixed and heated to get a usable solution. Even after being filtered several times, the dyes still fell out of solution. The formulations provided in the comparative examples are not stable over a period of time at room temperature.

Examples 11 and 12 illustrate the very poor washability exhibited by the formulations described in European Patent Publication No. 0017889. The formulations were tested on two fabrics. Fabric A was a 50% polyester/50% cotton blend. Fabric B was a 100% cotton fabric.

EXAMPLE 11—COMPARATIVE EXAMPLE

The formulations were tested after washing and then exposure to 20 minutes in a clothes dryer at medium heat. The fabrics were tested while folded.

| | ΔE Wash Value | |
|---|---|---|
| Sample | A | B |
| Purple | 29.03 | 32.35 |
| Yellow | 18.76 | 17.57 |
| Blue | 5.49 | 7.67 |

-continued

| Sample | ΔE Wash Value A | ΔE Wash Value B |
| --- | --- | --- |
| Orange | 24.84 | 25.85 |
| Green | 22.96 | 16.45 |
| Black | 6.63 | 6.39 |
| Red | 21.23 | 22.11 |
| Brown | 15.64 | 15.92 |

EXAMPLE 12—COMPARATIVE EXAMPLE

The formulations were tested after washing followed by air drying. The fabrics were tested on a single layer.

| Sample | ΔE Wash Value A | ΔE Wash Value B |
| --- | --- | --- |
| Purple | 34.41 | 36.66 |
| Yellow | 21.04 | 9.90 |
| Blue | 7.91 | 5.61 |
| Orange | 18.59 | 19.07 |
| Green | 18.70 | 19.16 |
| Black | 16.58 | 18.67 |
| Red | 18.12 | 19.30 |
| Brown | 13.03 | 15.18 |

By comparing Examples 1–9 with Examples 11–12 (Comparative Examples), it can be readily seen that the marking composition formulations of the present invention exhibit significantly better washability than the formulations described in European Patent Publication No. 0017889. In this regard, the formulations of the present invention display "slight" stains or better, while the formulations disclosed in European Patent Publication No. 0017889 provide very "heavy" stains.

While this invention has been described with an emphasis upon certain preferred embodiments, it will be apparent to those of ordinary skill in the art that variations in the preferred compositions and systems may be used and that it is intended that the invention may be practiced otherwise than as specifically described herein. Accordingly, this invention includes all modifications encompassed within the spirit and scope of the invention as defined by the following claims.

What is claimed is:

1. A marking system comprising:
   a composition comprising at least one color precursor and at least one additive selected from the group consisiting of surfactants, antioxidants, buffers, and any combination thereof;
   a substrate provided with a coating that comprises a color-triggering developer; and
   a marking instrument for applying said composition to said substrate to form at least one color mark exhibiting a fabric fugitivity defined in terms of ΔE, wherein the ΔE is about 5 or less.

2. The marking system of claim 1, wherein said composition further comprises at least one flame retardant.

3. The marking system of claim 2, wherein the at least one flame retardant is selected from the group consisting of trisnonylphonyl phosphite, brominated chlorinated olefins, and combinations thereof.

4. The marking system of claim 1, wherein said composition comprises at least one antioxidant selected from the group consisting of 3,5-bis (1,1-dimethylethyl)-4-hydroxy benzenepropanoic acid,2,2-bis[[3-[3.5-bis(1,1-dimethylethyl)-4-hydroxyphenyl]-1-oxopropoxy]methyl]1,3-propanediyl ester; Vitamin E; Tinuvins; butylated hydroxytoluene; butylated hydroxyanisole; and any combination thereof.

5. The marking system of claim 1, wherein said composition comprises at least one antioxidant, which is present in a concentration of from about 1% to about 30% by weight of said composition.

6. The marking system of claim 1, wherein the buffer is selected from the group consisting of non-water-soluble tertiary amines, and combinations thereof.

7. The marking system of claim 6, wherein the non-water-soluble tertiary amine is selected from the group consisting of tributyl amine, trihexyl amine, tridodecyl amine, tridecyl amine, trioctyl amine, and combinations thereof.

8. The marking system of claim 7, wherein the at least one non-water-soluble tertiary amine is present in a concentration of from about 0.0002% to about 1.5% by weight of said composition.

9. The marking system of claim 8, wherein the at least one non-water-soluble tertiary amine is present in a concentration of from about 0.05% to about 1.5% by weight of said composition.

10. The marking system of claim 1, wherein the color precursor is present in a concentration of from about 0.1% to about 10% by weight of said composition.

11. The marking system of claim 10, wherein the color precursor is present in a concentration of about 0.5% to about 2% by weight of said composition.

12. The marking system of claim 1, wherein the color precursor comprises at least one leuco dye intermediate.

13. The marking system of claim 12, wherein the leuco dye intermediate is not water soluble.

14. The marking system of claim 12, wherein the leuco dye intermediate is selected from the group consisting of diarylphthalide dyes, fluoran dyes, indolyphthalide dyes, acylluecoazine dyes, leucoauramine dyes, spiropyrane dyes, rhodaminelactam dyes, triarylmethane dyes, and chromene dyes, and combinations thereof.

15. The marking system of claim 12, wherein the leuco dye intermediate is selected from the group consisting of Spiro(12H-benzo(a)xanthene-12,1'(3'H)isobenzofuran-3'-one,9-(diethylamino),3-[Butyl-2-methylindol-3-yl]-3-(1-octyl-2-methylindol-3-yl)-1(3H)isobenzofuranone, 2-'phenylamino-3'-methyl-6'-(dibutylamino)spiro[isobenzofuran-1(3H),9'-(9H)-xanthen]-3-one, substituted Phthalide, COPIKEM® 7Grape, 2'-Di(phenylmethyl)amino-6'-(diethylamino)spiro(isobenzofuran-1(3H),9'(9H)xanthen)-3-one.

16. The marking system of claim 1, wherein the marking composition comprises at least one surfactant having an hydrophilic-lipophilic balance of about 6 or less.

17. The marking composition of claim 1, wherein the marking composition comprises at least one surfactant forming a surfactant blend, wherein the surfactant blend has a hydrophilic-lipophilic balance of from about 3 to about 6.

18. The marking composition of claim 1, wherein the marking composition comprises at least one surfactant selected from the group consisting of acetylinic diol based surfactants, ethoxylated acetylinic diols, dibasic ester microemulsion concentrates including water, and combinations thereof.

19. The marking system of claim 1, wherein the coating further comprises a binder.

20. The marking system of claim 19 wherein the binder is a starch-modified latex.

21. The marking system of claim 19, wherein the coating further comprises a cross-linker for cross-linking the binder.

22. The marking system of claim 21, wherein the cross-linker is selected from the group consisting of zirconium salts, zinc salts, and combinations thereof.

23. The marking system of claim 1, wherein said substrate is formed from a material selected from the group consisting of paper and plastic.

24. The marking system of claim 1, wherein the developer is selected from the group consisting of Lewis acids and combinations thereof.

25. The marking system of claim 24, wherein the Lewis acid is selected from the group consisting of activated clays, phenolic resins, zinc containing resins, and combinations thereof.

26. The marking system of claim 25, wherein the Lewis acid is selected from zinc containing resins and combinations thereof.

27. The marking system of claim 24, wherein the developer comprises a zincated carboxylic resin.

28. The marking system of claim 1, wherein the developer is present in a concentration of at least 12% by weight of the coating.

29. The marking system of claim 1, wherein the developer is dispersed in water.

30. The marking system of claim 1, wherein the coating further comprises a void cell former.

31. The marking system of claim 30, wherein the void cell former comprises calcium carbonate.

32. The marking system of claim 1, wherein the coating is provided in a concentration of at least about 10 grams of dry coating per square meter of substrate surface.

33. The marking system of claim 1, wherein said marking instrument is selected from the group consisting of markers, paintbrushes, pencils, pens, stamps, stamp pads, and crayons.

34. The marking system of claim 1, wherein the substrate further comprises an encapsulated solvent that is capable of being ruptured when said marking instrument applies said composition to said substrate.

35. The marking system of claim 1, wherein the color mark exhibits a fabric fugitivity defined in terms of $\Delta E$, wherein the $\Delta E$ is about 3 or less.

36. The marking system of claim 1, wherein the marking composition further comprises at least one dye blocker.

37. The marking system of claim 36, wherein the at least one dye blocker is selected from the group consisting of novolac epoxies and tannic acid.

38. The marking composition of claim 36, wherein the at least one dye blocker is present in a concentration of about 0.5% to about 15% by weight of the marking composition.

39. The marking system of claim 1, wherein the coating further comprises at least one plasticizer.

40. The marking system of claim 39, wherein the plasticizer is selected form the group consisting of citrate esters, dibutyl phthalate, and combinations thereof.

41. The marking system of claim 39, wherein the substrate further comprises a microcapsule wherein the at least one plasticizer is incorporated into the microcapsule.

42. The marking system of claim 1, wherein said composition is dissolved in at least one solvent.

43. The marking system of claim 42, wherein the at least one solvent is present in a concentration of from about 30% to about 90% by weight of said composition.

44. The marking system of claim 42, wherein the at least one solvent is selected from the group consisting of dimethyl adipate, diethyl succinate, dibutyl phthalate, chlorinated fluorinated toluenes, and combinations thereof.

45. The marking system of claim 42, wherein said at least one solvent is nonaqueous.

46. The marking system of claim 1, wherein said composition includes at least one antioxidant, wherein said at least one antioxidant comprises 3,5-bis (1,1-dimethylethyl)-4-hydroxy benzenepropanoic acid,2,2-bis[[3-[3.5-bis(1,1-dimethylethyl)-4-hydroxyphenyl]-1-oxopropoxy]methyl]1, 3-propanediyl ester.

47. The marking system of claim 1, wherein the composition includes at least one buffer, wherein said at least one buffer comprises trihexyl amine, tridecyl amine, or a combination thereof.

48. The marking system of claim 1, wherein the composition includes at least one surfactant, wherein the at least one surfactant comprises acetylinic diol based surfactants, ethoxylated acetylinic diol based surfactants, or combinations thereof.

49. The marking system of claim 1, wherein the composition comprises at least one surfactant, at least one antioxidant, and at least one buffer.

50. The marking system of claims 49, further comprising a flame retardant.

51. The marking system of claim 49, wherein the at least one antioxidant comprises 3,5-bis (1,1-dimethylethyl)-4-hydroxy benzenepropanoic acid,2,2-bis[[3-[3.5-bis(1,1-dimethylethyl)-4-hydroxyphenyl]-1-oxopropoxy]methyl]1, 3-propanediyl ester; the at least one buffer comprises trihexyl amine, tridecyl amine, or a combination thereof; and the at least one surfactant comprises acetylinic diol based surfactants, ethoxylated acetylinic diol based surfactants, or combinations thereof.

52. The marking system of claim 1, wherein the at least one antioxidant comprises 3,5-bis (1,1-dimethylethyl)-4-hydroxy benzenepropanoic acid,2,2-bis[[3-[3.5-bis(1,1-dimethylethyl)-4-hydroxyphenyl]-1-oxopropoxy]methyl]1, 3-propanediyl ester; wherein the at least one buffer comprises trihexyl amine, tridecyl amine, or a combination thereof; and wherein the at least one surfactant comprises acetylinic diol based surfactants, ethoxylated acetylinic diol based surfactants, or combinations thereof.

53. A marking system comprising:
   a composition comprising at least one color precursor and at least one additive selected from the group consisting of surfactants, antioxidants, buffers, flame retardants, dye blockers, and combinations thereof;
   a substrate provided with a coating that comprises a color-triggering developer; and
   a marking instrument for applying said composition to said substrate to form at least one color mark.

54. The marking system of claim 53, wherein the composition includes at least one surfactant, at least one antioxidant, and at least one buffer.

55. The marking system of claims 54, wherein the at least one antioxidant comprises 3,5-bis (1,1-dimethylethyl)-4-hydroxy benzenepropanoic acid,2,2-bis[[3-[3.5-bis(1,1-dimethylethyl)-4-hydroxyphenyl]-1-oxopropoxy]methyl]1, 3-propanediyl ester.

56. The marking system of claim 54, wherein the at least one buffer comprises trihexyl amine, tridecyl amine, or a combination thereof.

57. The marking system of claim 54, wherein the at least one surfactant comprises acetylinic diol based surfactants, ethoxylated acetylinic diol based surfactants, or combinations thereof.

58. The marking system of claim 53, wherein the at least one antioxidant comprises 3,5-bis (1,1-dimethylethyl)-4-hydroxy benzenepropanoic acid,2,2-bis[[3-[3.5-bis(1,1-